United States Patent [19]

Masar et al.

[11] 4,248,744

[45] Feb. 3, 1981

[54] THERMOSETTING POWDERS

[75] Inventors: Edward J. Masar, Sylvania; David J. Oberg, Perrysburg, both of Ohio; Ralph A. Williams, Placentia, Calif.

[73] Assignee: Inmont Corporation, New York, N.Y.

[21] Appl. No.: 67,966

[22] Filed: Aug. 20, 1979

Related U.S. Application Data

[63] Continuation of Ser. No. 914,653, Jun. 12, 1978, abandoned, which is a continuation of Ser. No. 743,682, Nov. 22, 1976, abandoned.

[51] Int. Cl.$^3$ ................................................ C08L 5/00
[52] U.S. Cl. ............................... 260/17.4 SG; 427/25
[58] Field of Search ................................. 260/17.4 SG

[56] References Cited

U.S. PATENT DOCUMENTS

| | | | |
|---|---|---|---|
| 3,245,941 | 4/1966 | Mayer et al. | 260/77.5 CR |
| 3,318,714 | 5/1967 | Coney et al. | 106/193 |
| 3,477,969 | 11/1969 | Parker | 260/17 |
| 3,495,998 | 2/1970 | Reeves et al. | 106/176 |
| 3,637,546 | 1/1972 | Parker | 260/15 |
| 3,660,355 | 5/1972 | Johnson et al. | 260/77.5 CR |
| 3,758,635 | 9/1973 | Labana et al. | 427/25 |
| 3,819,586 | 6/1974 | Rudolph et al. | 260/77.5 TB |
| 3,822,240 | 7/1974 | Schmitt et al. | 260/77.5 TB |
| 3,846,368 | 11/1974 | Pettit | 260/15 |
| 3,853,822 | 12/1974 | Brod et al. | 260/77.5 CR |
| 3,893,977 | 7/1975 | Wingler | 260/77.5 CR |
| 3,931,117 | 1/1976 | Leonard | 260/77.5 TB |
| 3,993,849 | 11/1976 | Victorius | 260/17 |

*Primary Examiner*—Edward M. Woodberry
*Attorney, Agent, or Firm*—Michael R. Chipaloski; F. S. Wyman

[57] ABSTRACT

Thermosetting powders, suitable for application by electrostatic spraying, onto conductive surfaces to form decorative and protective coatings. The powders contain, as essential ingredients, crosslinkable acrylic polymer, or polymers, a polyisocyanate as a crosslinking agent, and sucrose benzoate.

11 Claims, No Drawings

THERMOSETTING POWDERS

This application is a continuation of application Ser. No. 914,653 filed June 12, 1978, which in turn is a continuation of application Ser. No. 743,682 filed Nov. 22, 1976, both now abandoned.

This invention relates to thermosetting acrylic polymer powders for application to metal surfaces to produce decorative and protective finishes. The powders are especially useful in forming protective and decorative topcoats for metal surfaces such as automobile bodies by electrostatic spraying of the powder.

The prior art teaches that powders can be applied to conductive surfaces by means of electrostatic spray guns. Attempts to produce thermosetting powders suitable for application by electrostatic spray have not been very successful. There are many reasons for this, the thermosetting powders are too soft for adequate package stability, or too soft for good durability for the desired application, pinholing in the cured or thermoset coating, as automobile coatings they have poor resistance to gasoline and the cured coating may have poor gloss probably resulting from poor flow-out and leveling of the film during curing which results in considerable "orange peel" in the cured coating.

In accordance with the present invention the above disadvantages of prior art thermosetting powders are overcome by converting a mixture of an acrylic copolymer with a blocked polyisocyanate and sucrose benzoate to a powder suitable for application by electrostatic spray gun. It is necessary that the acrylic copolymer contain hydroxyl groups that will react with isocyanate groups to cross-link the polymer after it is applied to the desired surface. It is also necessary that the acrylic copolymer have a glass transition temperature, Tg, within the range of 45° to 95° C., where Tg of the copolymer is calculated from the equation $$\frac{1}{Tg} \text{(copolymer)} = \frac{W_1}{Tg_1} + \frac{W_2}{Tg_2} + \cdots \frac{W_n}{Tg_n}$$

where $W_1, W_2 \ldots W_n$ = weight fractions of acrylic monomer in copolymer and $Tg_1 \ldots Tg_n$ are glass transition temperatures of homopolymers in degrees Kelvin, in accordance with the prior art, e.g. Fox, Bull. Am. Phys. Soc., No. 3 (1956). Copolymers having a Tg above 95° C. give powders having poor flow properties on baking, while copolymers having Tg values below 45° C. give powders that have blocking tendencies at temperatures below 100° F.

The acrylic copolymers operable in the invention are those made in solution in a volatile solvent from a mixture of acrylic monomers with 0 to 25% by weight of styrene or a substituted sytrene such as α-methyl styrene and vinyl toluene. If more than 25% styrene or substituted styrene is used in the copolymer, the exterior resistance, especially to sunlight, and gasoline resistance of the resulting coatings are decreased significantly. The mixture of acrylic monomers must consist of at least 3% by weight, based on total monomers, of an active hydrogen containing monoethylenically unsaturated monomer having the formula

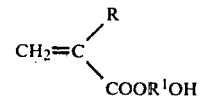

where R is hydrogen or methyl and $R^1$ is an alkylene radical containing 2 to 4 carbon atoms in order to produce coatings having the desired improvements in solvent (gasoline) resistance and cold crack resistance. Although the upper limit of the active hydrogen containing monomer is not critical, it has been determined that more than 25% by weight gives no increase in the benefits derived from such monomers. Of course since the active hydrogen containing monomer is usually more expensive than the other monomer, it is preferred to use only the amount of the active hydrogen monomer that is required to obtain the desired results. Typical active hydrogen containing monomers that can be used are hydroxyethyl acrylate, hydroxy ethyl methacrylate, hydroxypropyl acrylate and hydroxypropyl methacrylate. The other components of the mixture of acrylic monomers must not contain active hydrogen containing groups (other than traces of acrylic acid or methacrylic that may be present in the hydroxyl group containing monomer). The acrylic monomers which do not contain reactive hydrogen consists of 45 to 97% by weight, based on total weight of monomers, of one or more lower alkyl esters of methacrylic acid and 0 to 30% by weight, based on total monomers, of $C_1$ to $C_{12}$ alkyl esters of acrylic acid. Lower alkyl as used herein means $C_1$ to $C_6$ alkyl groups.

The acrylic copolymer component may be prepared in conventional manner in a volatile organic solvent for the monomers and the resulting resin using free radical catalysts.

The monomeric polyisocyanates that can be used in the invention include those that are conventionally used to make polyurethane resins by reaction with hydroxyl group containing reactants. By "monomeric polyisocyanate" it is meant that the polyisocyanate is not a "prepolymer" type of polyisocyanate, i.e., it is not a polymeric material containing isocyanate groups. For best properties in the final cured, or thermoset coatings prepared from the powders, the monomeric aliphatic polyisocyanates, are preferred because they give coatings having especially good outdoor weathering characteristics. The diisocyanates are usually preferred over triisocyanates, tetraisocyanates, etc., because they have less tendency to produce brittle coatings, but triisocyanates can also be used. Desirable monomeric diisocyanates include: isophorone diisocyanates, hexamethylene diisocyanate, and 4,4'-diisocyanato-dicylohexyl methane.

Although there are numerous reagents that can be used as blocking agents for the isocyanate groups to prevent reaction with the acrylic resin prior to application of the powder, it has been found that there is a great difference in the effectiveness of these prior art blocking agents. Of the numerous blocking agents that have been tested, caprolactam is the best and therefore is the preferred blocking agent. Other conventional blocking agents, such as ketoximes, are less desirable because they have a tendency when used alone as the blocking agent to produce pinholing in the cured coatings, and a "boiling" or "frothing" effect in severe cases. Also, package stability is poor if the blocking agent produces a blocked isocyanates which is tacky. One of the advantages of using caprolactam as the blocking agent is that it remains behind and acts as a plasticizer after the isocyanate is unblocked, while ketoximes, such as methyl ethyl ketoxime volatilizes more or less completely during the baking of the film.

In any event, the blocking agent used in the invention must be one that forms a compound, or complex, with the isocyanate and thereby inactivates the isocyanate group during the preparation, storage, and application of the powder. On the other hand, the compound or complex formed by the blocking agent and the isocyanate must readily decompose to regenerate the isocyanate groups at the curing temperature of the coating. The amount of blocking agent used must be sufficient to inactivate all of the isocyanate groups of the polyisocyanate and, as taught in the prior art, this will be one equivalent weight of blocking agent for each equivalent weight of isocyanate.

In accordance with the invention, a mixture of the acrylic polymer, as described above, a blocked polyisocyanate, as described above, and sucrose benzoate are dissolved in a mutual solvent and then co-precipitated from the solution as a finely divided particulate material which is then separated from the liquid and dried.

Advantageously, the acrylic polymer is made in a highly volatile solvent, under pressure if necessary, and at relatively low temperatures if desired, and then mixed with the desired amount of blocked polyisocyanate sucrose benzoate dissolved in the same solvent. Thereafter, the solution is spray dried to obtain the solute in the form of a fine powder. By proper control of the spray drying condition, the particle size of the powder can be controlled so that 85 to 95% by weight of the powder is of suitable size for electrostatic spray application. The preferred size range for application by electrostatic spraying is 15 to 75 microns.

Any particles that are too coarse to be usable, usually amounting to no more than 10% of the product, are screened out, re-dissolved, and re-sprayed.

Pigmented powders are prepared by dispersing the desired pigment in the solution of polymer, blocked polyisocyanate and sucrose benzoate prior to separating the mixture from solution as by spray drying. Preferably, the pigment is dispersed in a portion of the acrylic polymer solution prior to mixing the polymer solution with the blocked isocyanate and sucrose benzoate. The pigment dispersion may be made using conventional milling or dispersing equipment providing adequate means are provided to control the evaporation of the volatile solvent. The amount of pigment that can be included will depend on the particular pigment used and the intensity of color desired in the final coating as is well understood by those knowledgeable in the art.

Sucrose benzoate is a necessary ingredient in the powder paint to provide superior gloss and leveling on baking of the powder coating. Sucrose benzoate is an ester of sucrose and benzoic acid having the approximate formula $C_{12}H_{14}O_3(C_6H_5COO)_7$. It is a glossy clear solid having a softening point, Ball & Ring Method, of 98° C. It is used in amounts ranging from 2 to 15%, preferably 5 to 15%, by weight, of film forming vehicle.

Other conventional additives may be included in the powder as desired and, when used, they should be dissolved or dispersed in the resin solution prior to formation of the powder. Additives which may be desirable include:

Cellulose Acetate Butyrate ½ to 5% (to improve intercoat adhesion on repair of the finish), A silicone material, such as U.C. L5310 ¼ to 3% (as a flow control agent), "Butyl Cellosolve" ½ to 3% (to improve flow out on baking), Cab-O-Sil ½ to 2% (to improve flow properties of the dry powder), "Modaflow" ½ to 3% (as flow control agent and anti-cratering agent).

The following examples in which the parts are by weight will further illustrate the invention. In each of the examples, the polymers are prepared in a highly volatile solvent, e.g. methylene chloride, in a closed container which has been purged with an inert gas.

EXAMPLE 1

A mixture of monomers, solvent and catalyst consisting of:

|  | Parts |
| --- | --- |
| Methyl methacrylate | 600 |
| Isobutyl methacrylate | 600 |
| Butyl methacrylate | 500 |
| Hydroxyethyl methacrylate | 300 |
| Methylene chloride | 1,000 |
| Benzoyl peroxide (Lucidol 98) | 45.5 | was added over a period of 75 minutes to a previously prepared solvent and catalyst mixture consisting of:

|  | Parts |
| --- | --- |
| Methylene chloride | 700 |
| Benzoyl peroxide (Lucidol 98) | 9 | while the mixture was maintained at a temperature of about 95° C. to 108° C. and held at a temperature of 108° C. for 20 minutes after addition of the monomer mixture was complete. Then additional catalyst mixture consisting of:

|  | Parts |
| --- | --- |
| Methylene chloride | 200 |
| Benzoyl peroxide | 2 | was added over a period of 20 to 30 minutes while allowing the temperature to drift off to about 100° C. The mixture was then held at 100° C. for two hours and then diluted with 500 parts of methylene chloride, using the methylene chloride as a rinse to transfer the resin solution product to a storage container. The resulting resin solution contains 44 to 45% by weight of non-volatiles and has a viscosity of 3.6 poises at 45% solids and 25° C. This polymer solution is referred to hereinafter as Polymer A. The polymer has a Tg (calculated) of 54° C.

A second polymer solution was prepared by adding a solution of monomers and catalyst consisting of:

|  | Parts |
| --- | --- |
| Styrene | 120 |
| Isobutyl methacrylate | 120 |
| Butyl methacrylate | 100 |
| Hydroxyethyl methacrylate | 60 |
| Methylene chloride | 100 |

| | Parts |
|---|---|
| Benzoyl peroxide (Lucidol 98) | 6.9 | to a reaction vessel containing:

| | Parts |
|---|---|
| Methylene chloride | 440 | heated at 95° to 108° C. over a period of 15 minutes. The addition is started at 95° C. with heating being continued until the temperature reaches 108° C. (about 8–10 minutes) and then the temperature is maintained at 108° C. until the addition is complete. Then additional catalyst and monomer mixture consisting of:

| | Parts |
|---|---|
| Styrene | 480 |
| Isobutyl methacrylate | 480 |
| Butyl methacrylate | 400 |
| Hydroxyethyl methacrylate | 240 |
| Methylene chloride | 800 |
| Benzoyl peroxide | 34 |
| t-Butyl perbenzoate | 4 | was added over a period of 70 minutes while maintaining the temperature at 108° C. When the addition is complete, additional catalyst solution consisting of:

| | Parts |
|---|---|
| Methylene chloride | 400 |
| Benzoyl peroxide | 10 | was added over a period of 40–45 minutes while allowing the temperature to go down to about 100° C. After this addition is complete, the reaction is held at 100° C. for two hours, then cooled to room temperature with addition of 440 parts of methylene chloride. The resulting polymer solution contained 44–45% non-volatiles and had a viscosity of 2.9 poises at 45% non-volatiles at 25° C. This polymer solution is referred to hereinafter as Polymer B. The polymer has a Tg (calculated) of 54° C.

| Pigment Dispersion A | Parts |
|---|---|
| Titanium dioxide | 186 |
| Yellow Iron oxide | 59 |
| Phthalocyanine green | 7 |
| Carbon black | 5 | were dispersed by attrition milling in

| | Parts |
|---|---|
| Polymer B | 227 |
| Methylene chloride | 125 | to a particle size less than 10 microns.

| Powder Paint | |
|---|---|
| A mixture of: | |
| Pigment Dispersion A | 108 |
| Polymer A | 748 |
| Sucrose benzoate (25% in methylene chloride) | 36 |
| Modaflow (10% solution in methylene chloride) | 45 |

| Powder Paint | |
|---|---|
| Zinc neodecanoate catalyst (13% in methylene chloride) | 11 |
| | Parts |
| Adduct of 2.22 parts of isophorone diisocyanate and 2.283 parts of caprolactam (20% in methylene chloride) | 472 |
| Methylene chloride | 1,080 | was spray dried at 130° F. (54° C.) inlet temperature, 105° F. (41° C.) using an airless pump, atomization pressure of 2,400 pounds, at the rate of 85 pounds of solution/hour to obtain a dry powder paint having an average diameter of 35 microns.

The powder paint was applied by electrostatic spray gun equipment to steel panels previously coated with an automotive epoxy ester primer surfacer. The panel and powder paint were baked 10 minutes at 250° F. (121° C.) followed by 20 minutes at 350° F. (177° C.) to a cured powder film thickness of 2.2 to 3.0 mils (56 to 76 microns). The cured film had a gloss of 75 on a 20° meter and flow out equaled current commerically used automotive thermosetting acrylic top coatings. In these respects it was better than a similar powder paint made without sucrose benzoate. Also, the powder paint did not reagglomerate (i.e. block) as easily as the powder paint made without sucrose benzoate. Further, the cured powder topcoat had excellent hardness (15 knoops), good gloss retention when subjected to accelerated aging; humidity resistance, salt spray resistance, gasoline resistance, cold crack resistance, and stone chip (gravelometer) resistance compared favorably with currently used automotive finishes.

EXAMPLE 2

A mixture of

| | Parts |
|---|---|
| A mixture of | |
| Pigment Dispersion A (from Example 1) | 108 |
| Polymer A (from Example 1) | 681 |
| Sucrose Benzoate Solution (as in Example 1) | 182 |
| Modaflow Solution (as in Example 1) | 45 |
| Zinc Neodecanoate Solution (as in Example 1) | 11 |
| Adduct of 2.22 parts isophorone and 2.283 parts of caprolactam (20% solution in methylene chloride) | 431 |
| Methylene chloride | 1,222 | was spray dried as in Example 1 to obtain a dry powder paint having an average diameter of 35 microns. This powder paint contained about 10% by weight, based on non-volatile vehicle, of sucrose benzoate compared to about 2% for Example 1. The powder paint was applied and baked as in Example 1 to give a finish better gloss (80 on 20° gloss meter), flow out and leveling, and storage stability than the powder paint of Example 1. Flow out and leveling was better than current commercial thermosetting acrylic enamel topcoats and approached the flow out and leveling behavior of thermoplastic acrylic automotive finishes. After two years Florida exposure, the topcoat had 90+% gloss retention without discoloration or hazing.

EXAMPLE 3

A powder paint containing approximately 15% sucrose benzoate, based on non-volatile vehicle solids, was prepared as in the above Examples from:

|  | Parts |
|---|---|
| Pigment Dispersion A | 108 |
| Polymer A | 642 |
| Sucrose Benzoate Solution (as in Example 1) | 273 |
| Modaflow Solution (as in Example 1) | 45 |
| Zinc Neodecanoate Solution (as in Example 1) | 11 |
| Blocked Diisocyanate Solution (as in Example 1) | 409 |
| Methylene Chloride | 1,012 |

The resultant powder paint, when evaluated as in the above examples had a gloss, flow out and leveling better than that of Example 2 and equal thermoplastic acrylic automotive topcoats; however, resistance to solvents such as toluene, and methyl ethyl ketone were not as good as the previous examples.

What is claimed is:

1. A powder suitable for application by electrostatic powder spray gun to conductive surfaces, said powder being comprised of a mixture of (A) an acrylic polymer (B) a blocked polyisocyanate, and (C) 2 to 15% by weight, based on film forming solids, of sucrose benzoate, said acrylic polymer being a copolymer of a mixture of (a) 0 to 25% by weight, of a monomer of the group consisting of styrene, α-methyl styrene and vinyl toluene, (b) 3 to 25% by weight of an active hydrogen containing monoethylenically unsaturated compound of the formula

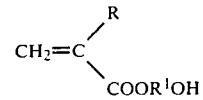

where R is hydrogen or methyl and $R^1$ is an alkylene radical containing 2 to 4 carbon atoms, (c) 45 to 97% by weight of a lower alkyl ester of methacrylic acid and (d) 0 to 30% by weight of a lower alkyl ester of acrylic acid, said acrylic resin being further characterized as having a glass transition temperature between 45° C. and 95° C., and wherein the ratio of (A) and (B) is substantially 1:1 on the basis of equivalents of hydroxyl groups in (A) to isocyanate groups in (B).

2. A powder as in claim 1 wherein the blocked polyisocyanate is a blocked diisocyanate.

3. A powder as in claim 1 which contains 1 to 50% by weight of pigment.

4. A powder as in claim 2 wherein the blocked polyisocyanate is decomposable at 250° F. to 350° F.

5. A powder as in claim 2 wherein the polyisocyanate is blocked with caprolactam.

6. A powder as in claim 2 wherein the acrylic resin is a copolymer of 30% methyl methacrylate, 30% isobutyl methacrylate, 25% butyl methacrylate and 15% hydroxyethyl methacrylate.

7. A powder as in claim 2 wherein the powder is prepared by spray drying a volatile solvent solution of the blocked polyisocyanate and the acrylic polymer.

8. A powder as in claim 7 wherein the solvent is methylene chloride.

9. A powder as in claim 2 wherein the acrylic polymer is a copolymer of 30% styrene, 30% isobutyl methacrylate, 25% butyl methacrylate and 15% hydroxyethyl methacrylate.

10. A powder as in claim 2 wherein the polyisocyanate is isophorone diisocyanate.

11. A powder as in claim 2 wherein the amount of sucrose benzoate is 5 to 15% by weight, based on film forming solids.

* * * * *